US011821156B1

(12) United States Patent
Farmer et al.

(10) Patent No.: US 11,821,156 B1
(45) Date of Patent: Nov. 21, 2023

(54) TRACK CLEANER AND GRINDER HEAD ATTACHMENT

(71) Applicant: Mineral Products, Inc., Harrisburg, IL (US)

(72) Inventors: Jerry Farmer, Galatia, IL (US); Wayne Conner, Geneva, IL (US); Wally Schultz, Gallatin, TN (US); Yan Chen, Marion, IL (US)

(73) Assignee: Mineral Products, Inc., Harrisburg, IL (US)

( * ) Notice: Subject to any disclaimer, the term of this patent is extended or adjusted under 35 U.S.C. 154(b) by 729 days.

(21) Appl. No.: 16/793,200

(22) Filed: Feb. 18, 2020

Related U.S. Application Data

(60) Provisional application No. 62/903,324, filed on Sep. 20, 2019.

(51) Int. Cl.
| | |
|---|---|
| *E01H 8/10* | (2006.01) |
| *B65G 19/04* | (2006.01) |
| *B60F 1/04* | (2006.01) |
| *E01H 8/06* | (2006.01) |

(52) U.S. Cl.
CPC .............. *E01H 8/10* (2013.01); *B60F 1/04* (2013.01); *B65G 19/04* (2013.01); *E01H 8/06* (2013.01)

(58) Field of Classification Search
CPC ........... E01H 1/02; E01H 1/042; E01H 1/045; E01H 1/05; E01H 1/056; E01H 8/00; E01H 8/02; E01H 8/06; E01H 8/10; B60F 1/00; B60F 1/04; B65G 19/00; B65G 19/04; E01B 2203/086
See application file for complete search history.

(56) References Cited

U.S. PATENT DOCUMENTS

| | | | | |
|---|---|---|---|---|
| 2,398,241 | A | * | 4/1946 | Miller ...................... E01H 8/00 15/55 |
| 2,748,720 | A | | 6/1956 | Kling |
| 2,814,387 | A | | 11/1957 | McWilliams |
| 3,249,067 | A | | 5/1966 | Keller |
| 3,503,339 | A | | 3/1970 | Kershaw |
| 3,579,873 | A | | 5/1971 | Kershaw |
| 3,605,297 | A | | 9/1971 | Kershaw |

(Continued)

FOREIGN PATENT DOCUMENTS

| | | | | |
|---|---|---|---|---|
| CN | 110130265 A | * | 8/2019 | ............... E01H 8/06 |
| KR | 101718124 B1 | * | 3/2017 | ............... E01H 1/02 |

*Primary Examiner* — S. Joseph Morano
*Assistant Examiner* — Cheng Lin
(74) *Attorney, Agent, or Firm* — Garvey, Smith & Nehrbass, Patent Attorneys, L.L.C.; Seth M. Nehrbass; Fabian M. Nehrbass

(57) ABSTRACT

The present invention is a grinder head for attaching to a track cleaner. The present invention also includes the grinder head attached to a track cleaner. Preferably, the present invention will continuously grind and load hard frozen minerals like taconite or ice. In addition, the present invention preferably aids in removal of hard-to-handle material such as wet, sticky bentonite from tracks which can be difficult in the summer months. The grinder head attachment will preferably allow operators to use a track cleaner to remove materials, preferably in one pass, during the colder months when the bentonite is frozen and much easier to handle. Preferably, the present invention will also be able to remove concrete or asphalt surfaces at road crossings.

15 Claims, 14 Drawing Sheets

(56) References Cited

U.S. PATENT DOCUMENTS

| | | | |
|---|---|---|---|
| 3,877,160 A * | 4/1975 | Plasser | E01B 27/023 |
| | | | 37/232 |
| 4,290,820 A * | 9/1981 | Swisher, Jr. | E01C 23/08 |
| | | | 198/514 |
| 4,520,735 A * | 6/1985 | Field | B60F 1/043 |
| | | | 105/215.2 |
| 4,741,072 A * | 5/1988 | Wilkerson | E01H 8/00 |
| | | | 15/348 |
| 5,868,078 A | 2/1999 | Madison | |
| 6,152,648 A | 11/2000 | Gfroerer et al. | |
| 6,745,502 B1 | 6/2004 | Desmarais et al. | |
| 7,134,620 B1 | 11/2006 | Lee | |
| 8,316,774 B1 | 11/2012 | Coots | |
| 9,194,089 B2 | 11/2015 | Jeevanantham et al. | |
| 10,094,078 B2 | 10/2018 | Husar | |
| 2009/0232598 A1 | 9/2009 | Cochran et al. | |
| 2012/0222580 A1 * | 9/2012 | Grammatis | E01H 8/06 |
| | | | 104/279 |

* cited by examiner

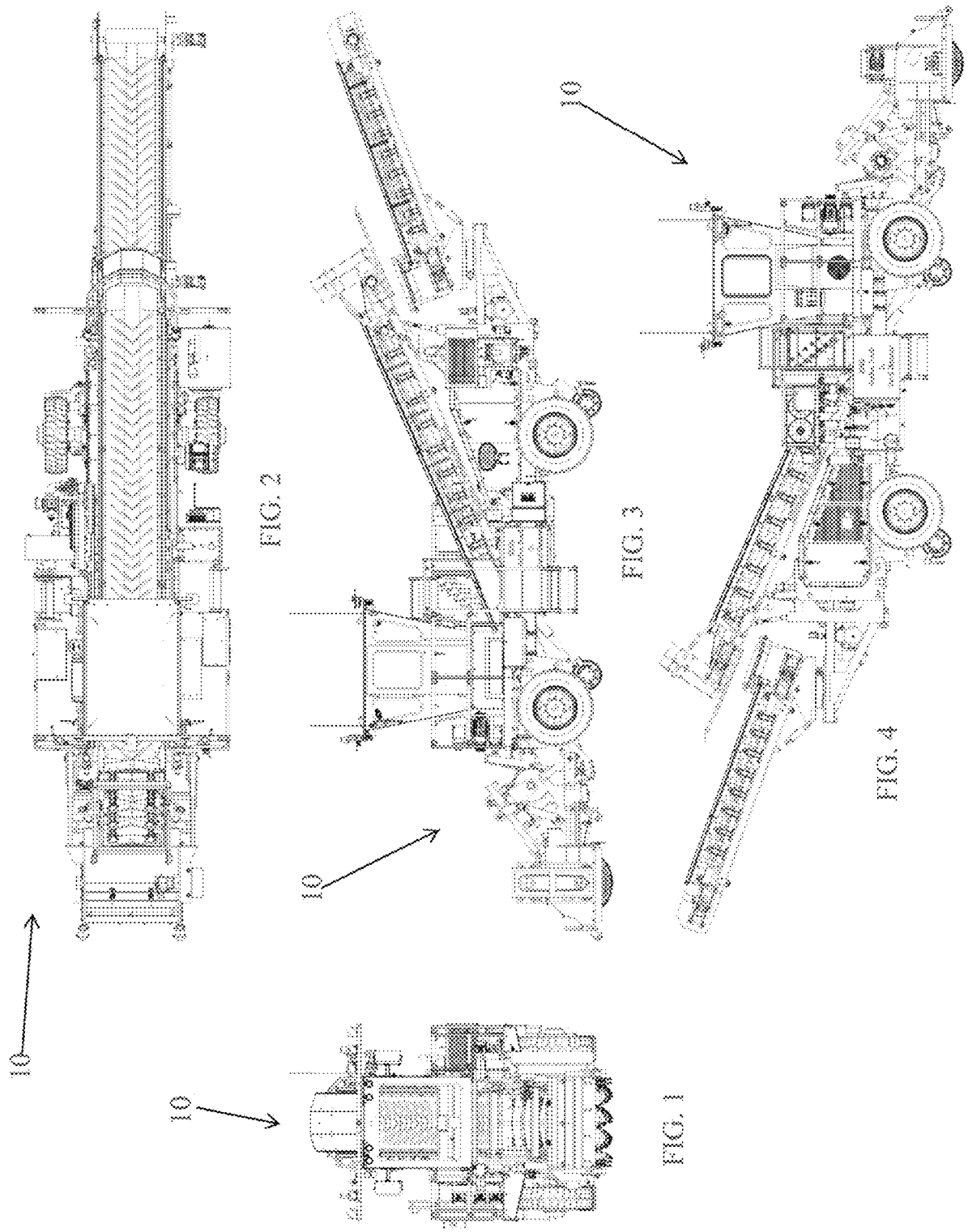

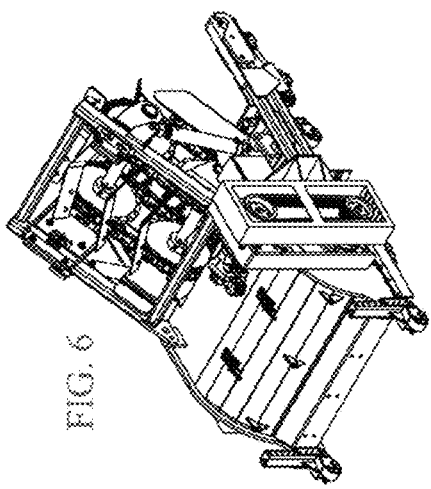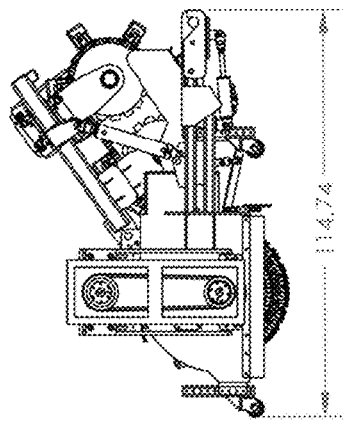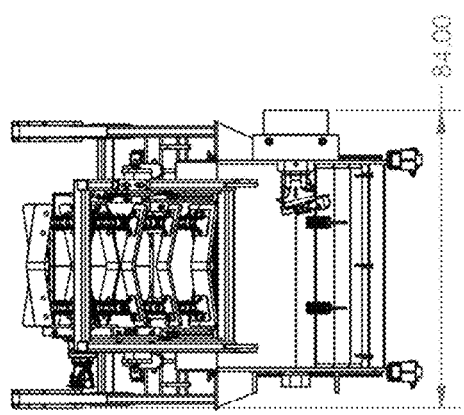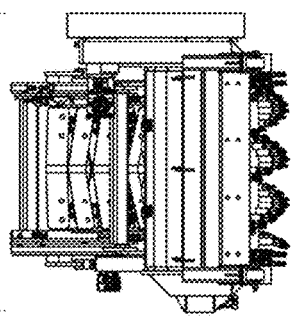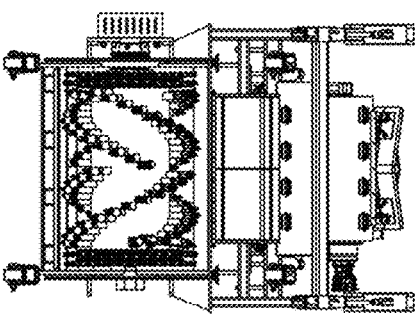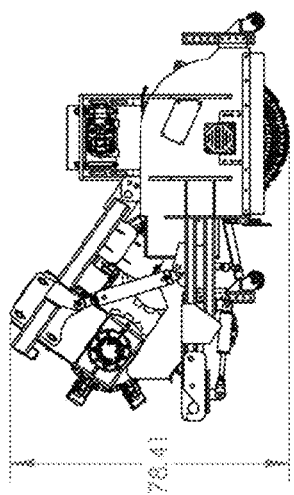
Assembly View

Exploded View

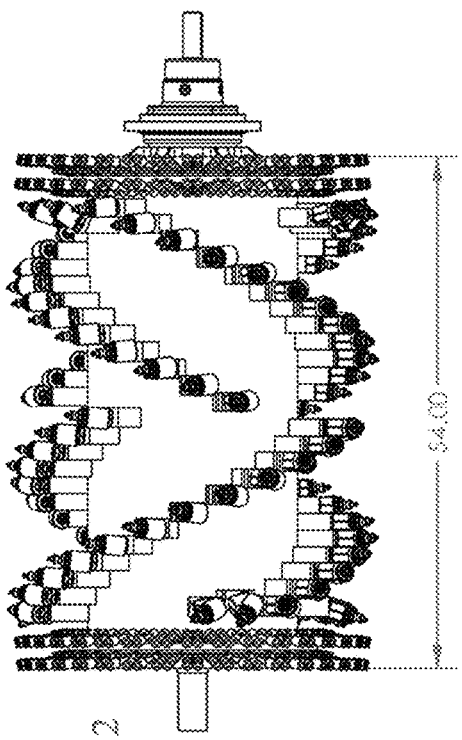
FIG. 12
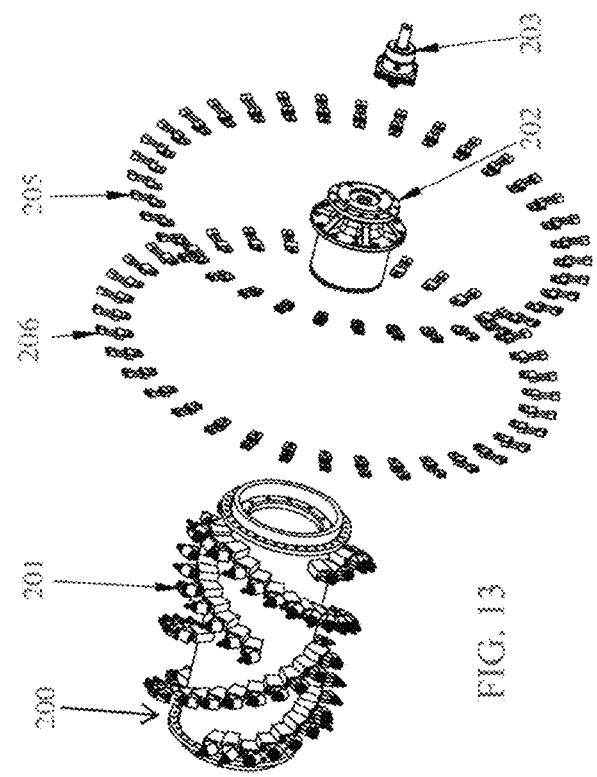
FIG. 13
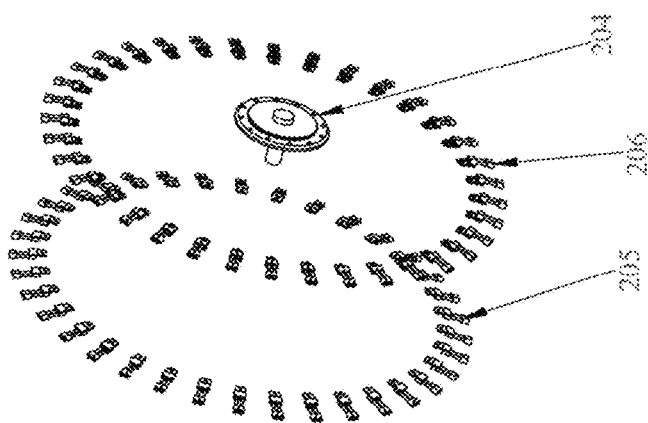

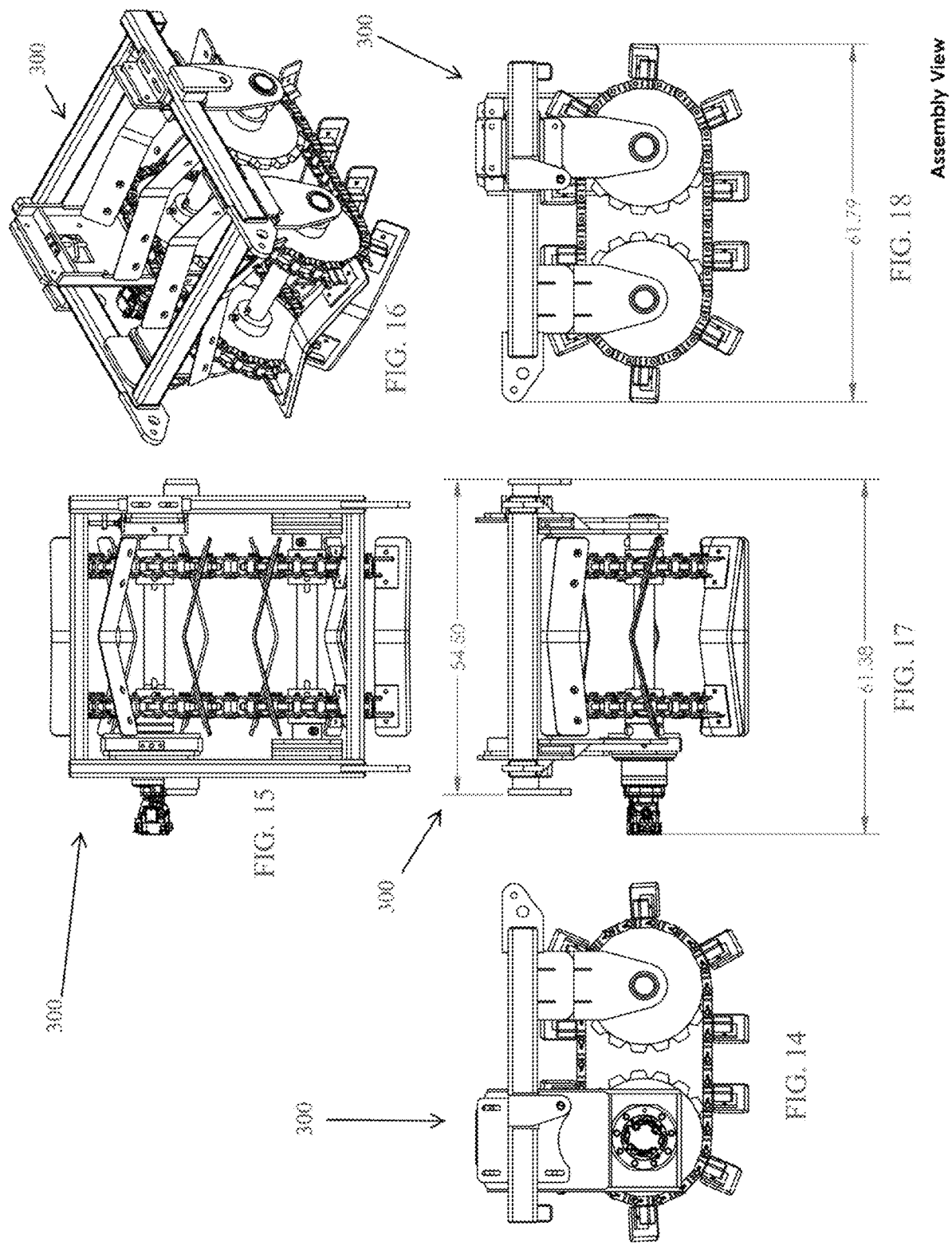

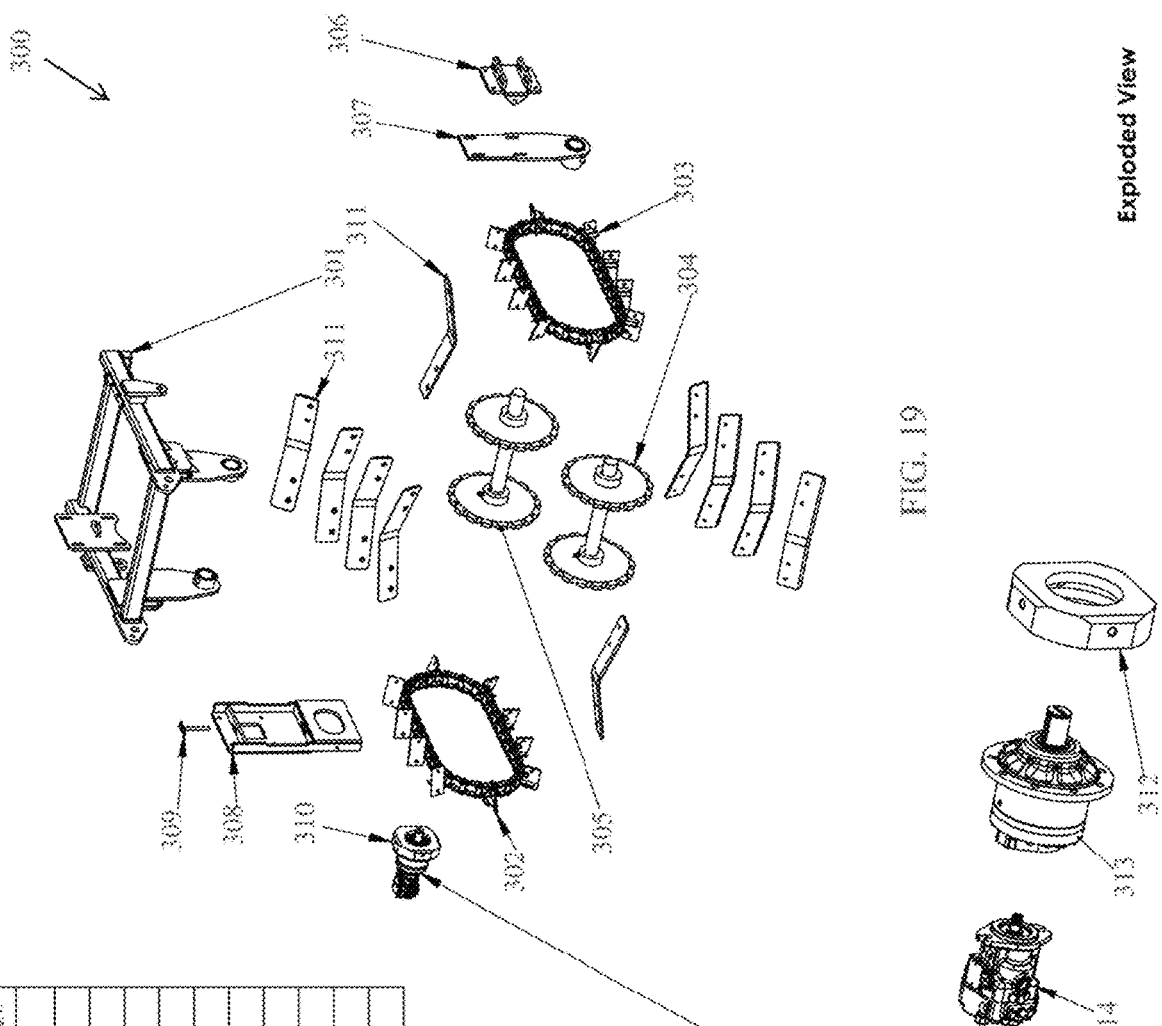
FIG. 19 Exploded View

TRACK CLEANER AND GRINDER HEAD ATTACHMENT

CROSS-REFERENCE TO RELATED APPLICATIONS

This application claims the benefit of U.S. Provisional Patent Application Ser. No. 62/903,324; filed on Sep. 20, 2019, which is hereby incorporated herein by reference. Priority of U.S. Provisional Patent Application Ser. No. 62/903,324; Filed: Sep. 20, 2019 is hereby claimed. This application incorporates by reference U.S. patent application Ser. No. 15/717,768, filed on 27 Sep. 2017.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a grinder head for attaching to a track cleaner similar to that disclosed in U.S. patent application Ser. No. 15/717,768. More particularly, the present invention relates to a track cleaner attachment for breaking up and removing ice, and other solid or semi-solid refuse from railroad tracks. The present invention also includes the grinder attached to a track cleaner similar to that of U.S. patent application Ser. No. 15/717,768, with modifications to maximize the removal of debris associated with the grinder head attachment of the present invention.

2. General Background of the Invention

Particulate material such as iron ore pellets, raw iron ore, taconite, coal, sand, gravel, rocks, stones, sawdust, ice, snow, and corn which falls from passing railroad cars onto a track may accumulate to the point where it can interfere with safe train operation and with proper railroad track inspection. By law, all railroads must be inspected. Tracks and cross ties cannot be inspected if there is spillage on the tracks. In the past, the railroad would clean between the rails but they would dump the spillage beside the tracks. Now, the EPA requires that the spillage cannot be dumped beside the tracks; instead, it must be picked up and disposed of properly. This clean-up can be made more difficult by cold or freezing temperatures and snow and ice accumulation along with the already-present debris.

Currently, frozen debris, ice, snow and other solid or semi-solid items that collect between rails are cleared using a backhoe or other similar equipment. This is time-consuming and not always effective because the debris has to be broken up before it can be removed. The present invention allows for a railroad track cleaner to break up, remove, and discard ice or other solid or semi-solid debris (such as bentonite) from railroad tracks, and between the rails in a much more efficient and effective manner.

U.S. Pat. Nos. 5,868,078; 9,194,089; and, 10,094,078 are incorporated herein by reference.

BRIEF SUMMARY OF THE INVENTION

The present invention is a grinder head for attaching to a track cleaner. The present invention also includes the grinder head attached to a track cleaner. Preferably, the present invention will continuously grind and load hard frozen minerals like taconite or ice. In addition, the present invention preferably aids in removal of hard-to-handle material such as wet, sticky bentonite from tracks which can be difficult in the summer months. The grinder head attachment will preferably allow operators to use a track cleaner to remove materials, preferably in one pass, during the colder months when the bentonite is frozen and much easier to handle. Preferably, the present invention will also be able to remove concrete or asphalt surfaces at road crossings.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1-4 show various views of a preferred embodiment of the grinder head and track cleaner apparatus of the present invention;

FIGS. 5-10 show various views of a preferred embodiment of the grinder head of the present invention;

FIG. 12 shows a close-up view of a preferred embodiment of the drum, teeth, and wire rope teeth of the present invention;

FIG. 13 shows an exploded view of a preferred embodiment of the drum of the present invention;

FIGS. 14-18 show various views of a preferred embodiment of the drag conveyor of the present invention;

FIG. 19 shows an exploded view of a preferred embodiment of the drag conveyor of the present invention;

DETAILED DESCRIPTION OF THE INVENTION

Figure 11:
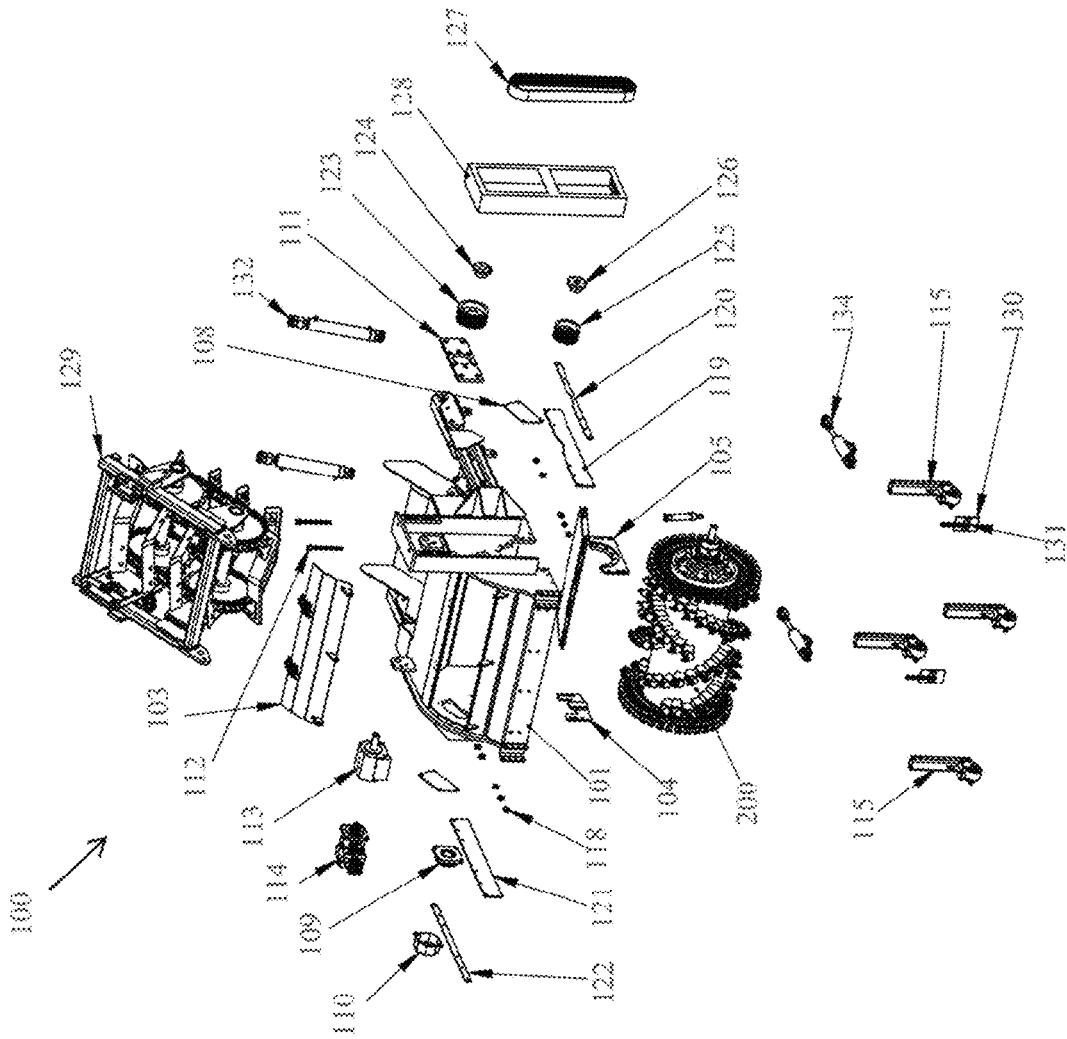
FIG. 11 shows an exploded view of a preferred embodiment of the grinder head of the present invention.
Figure 20:
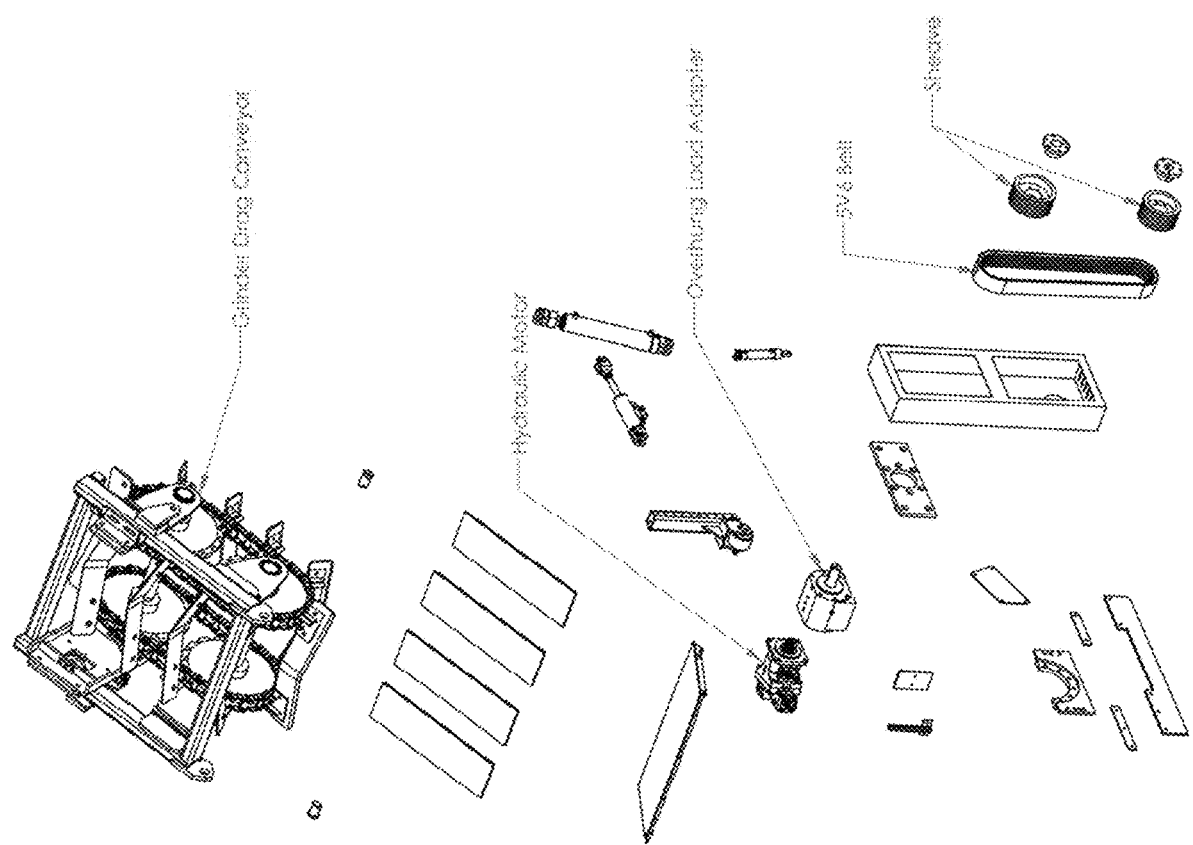
FIG. 20 shows an exploded view of a preferred embodiment of the grinder head of the drag conveyor of the present invention.
Figure 21:
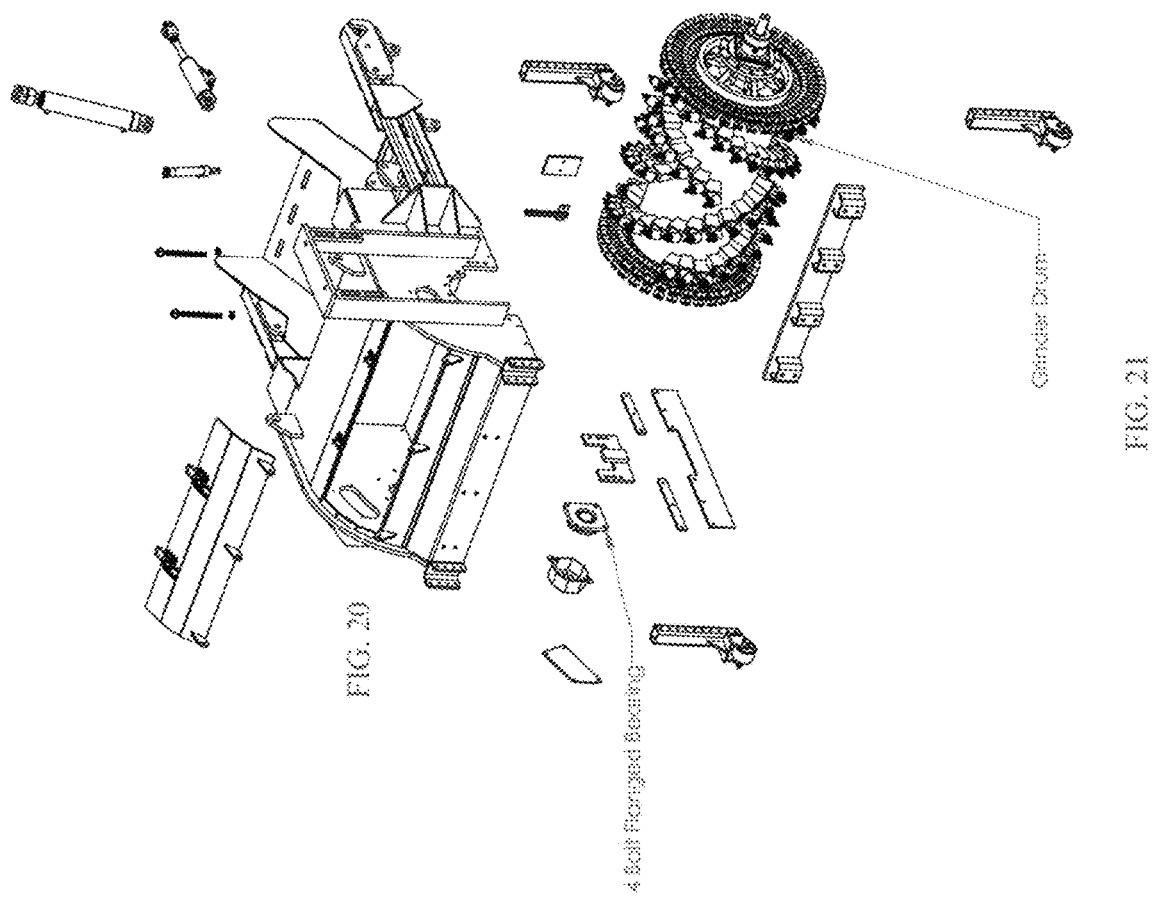
FIG. 21 shows an exploded view of a preferred embodiment of the drum and drag conveyor of the present invention.
Figure 23:
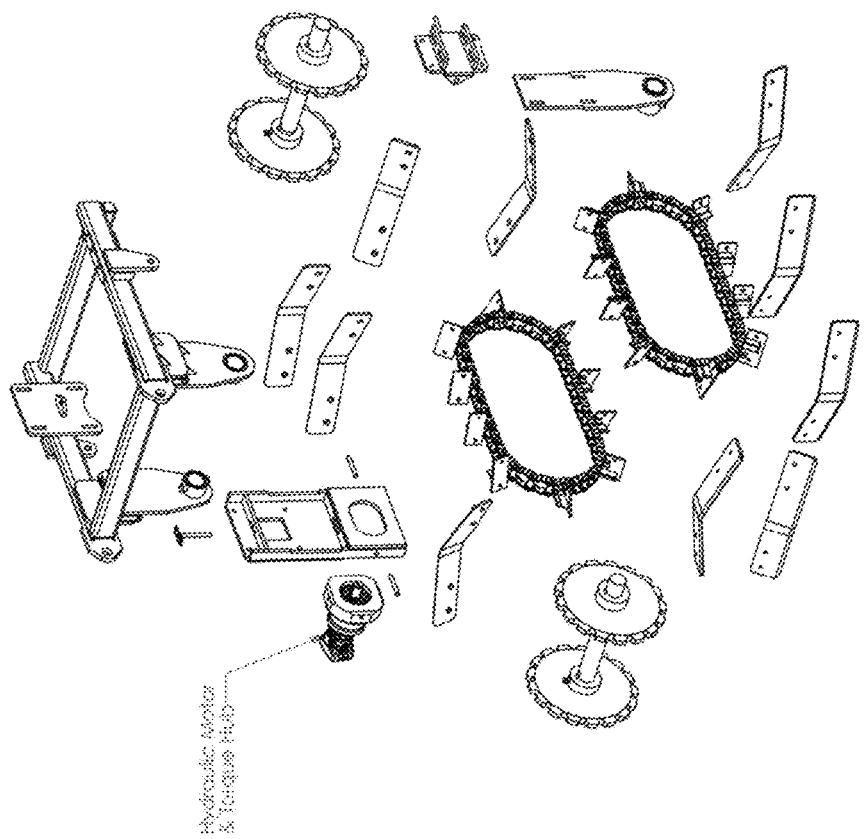
FIG. 23 shows an exploded view of a preferred embodiment of the drag conveyor of the present invention.
Figure 22:
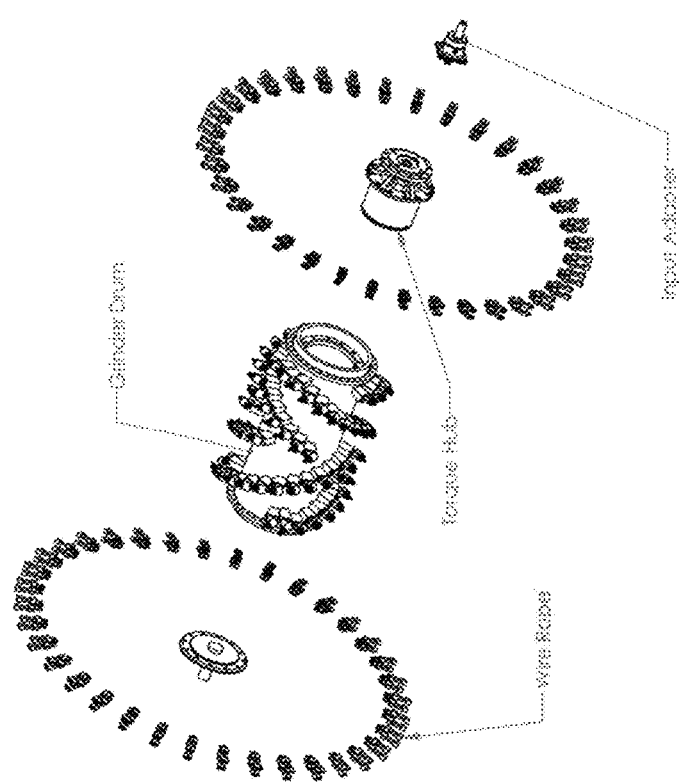
FIG. 22 shows an exploded view of a preferred embodiment of the wire teeth and drum of a preferred embodiment of the drum of the present invention.
Figure 24:
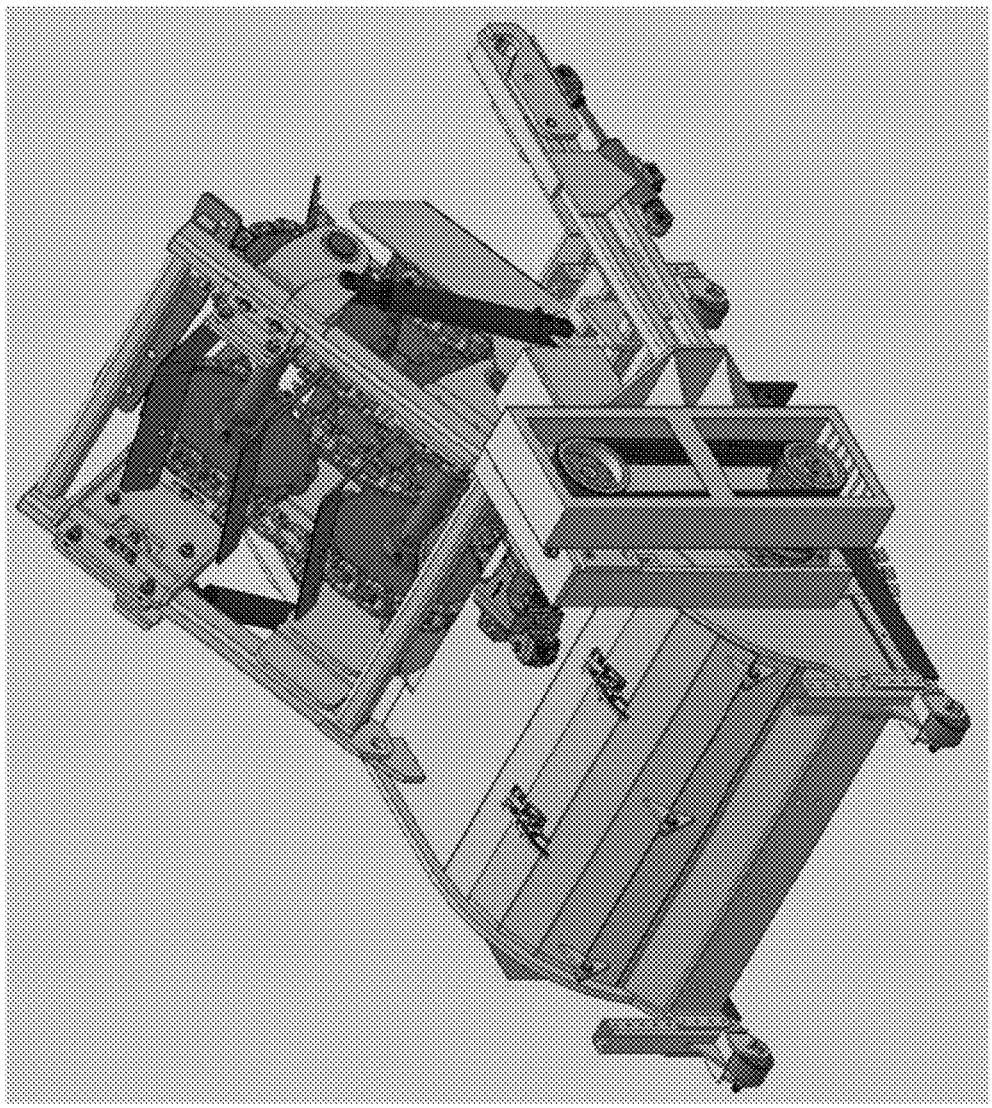
FIG. 24 shows a perspective view of a preferred embodiment of the grinder head and drag conveyor of the present invention.
Figure 25:
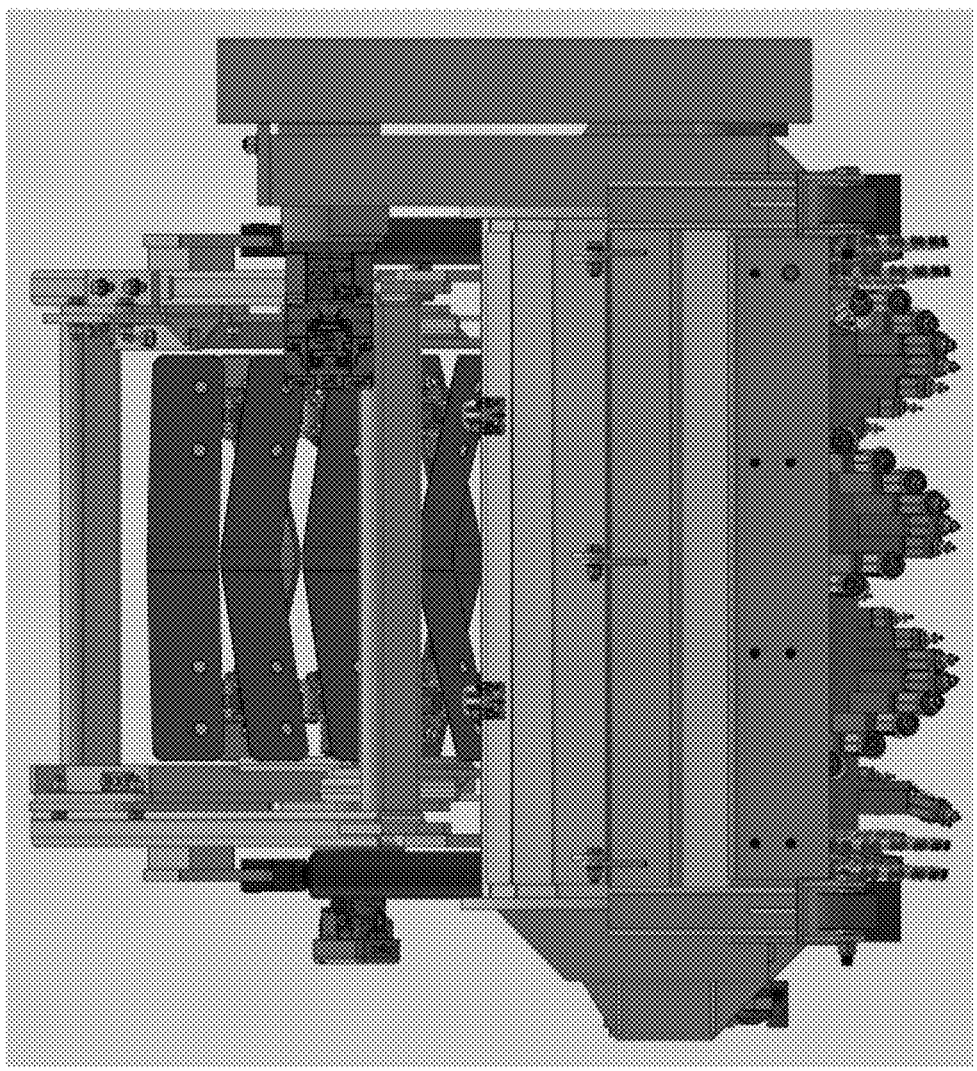
FIG. 25 shows a front view of a preferred embodiment of the grinder head and drag conveyor of the present invention.
Figure 26:
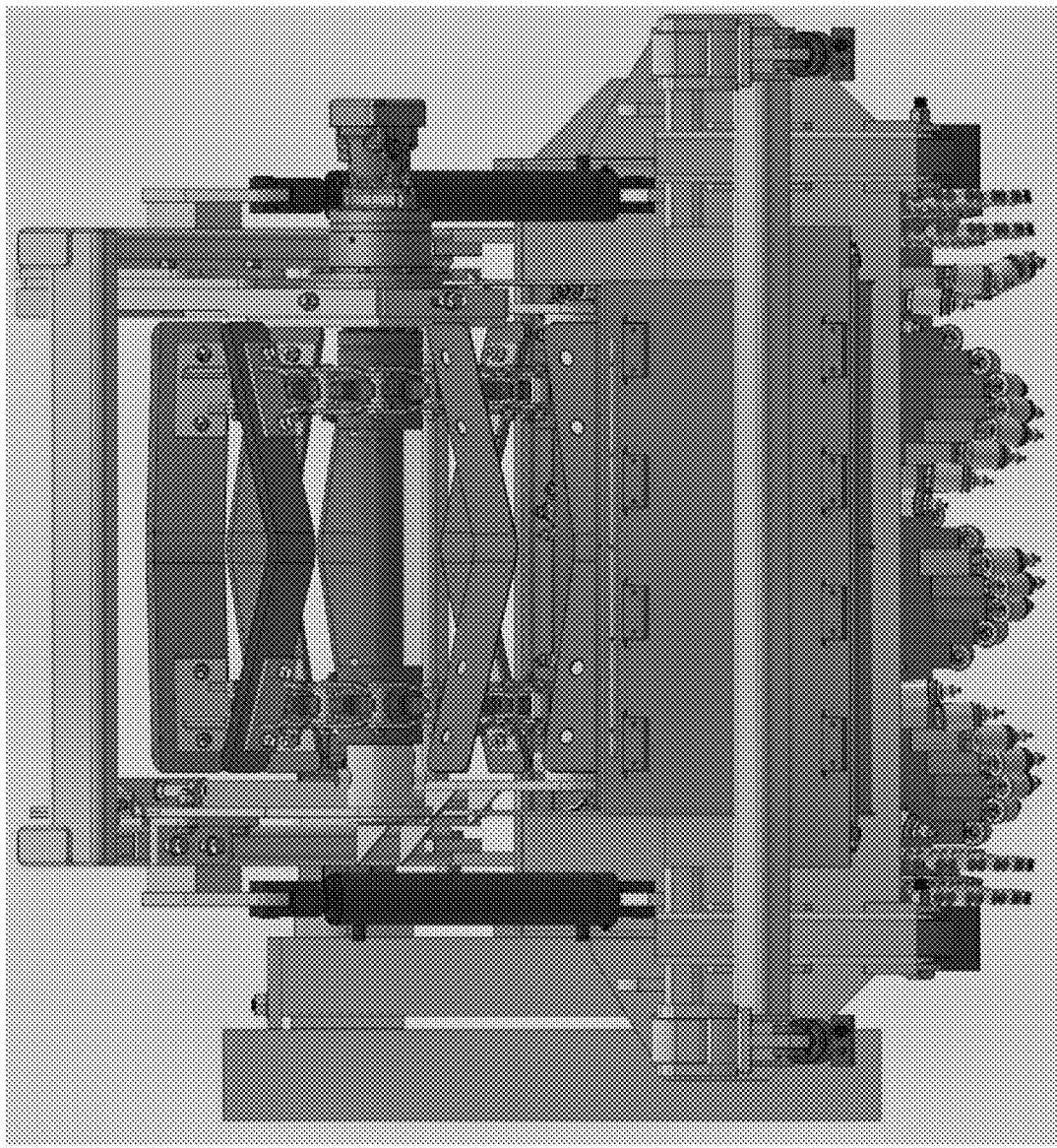
FIG. 26 shows a back view of a preferred embodiment of the grinder head and drag conveyor of the present invention.
Figure 27:
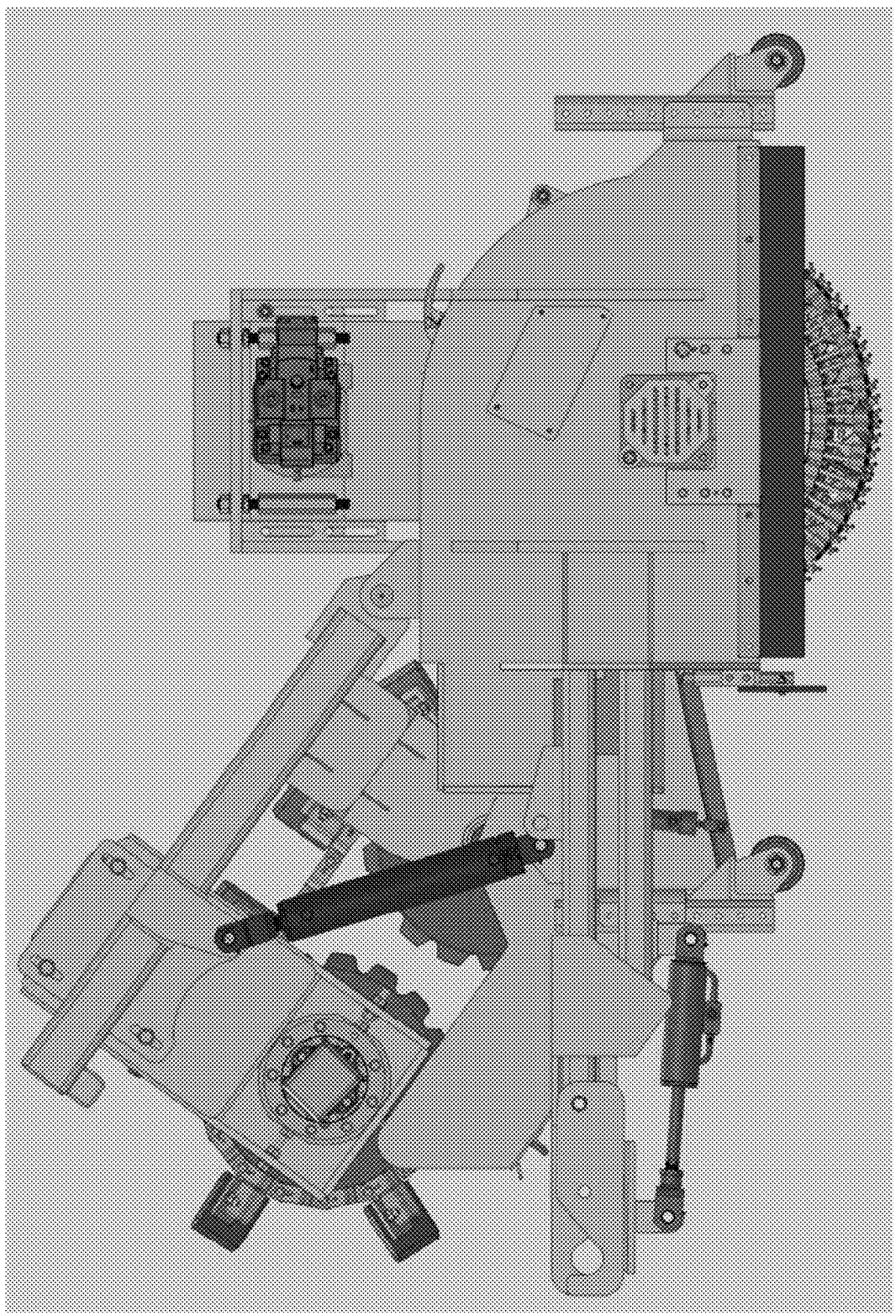
FIG. 27 shows a side view of a preferred embodiment of the grinder head and drag conveyor of the present invention.
Figure 28:
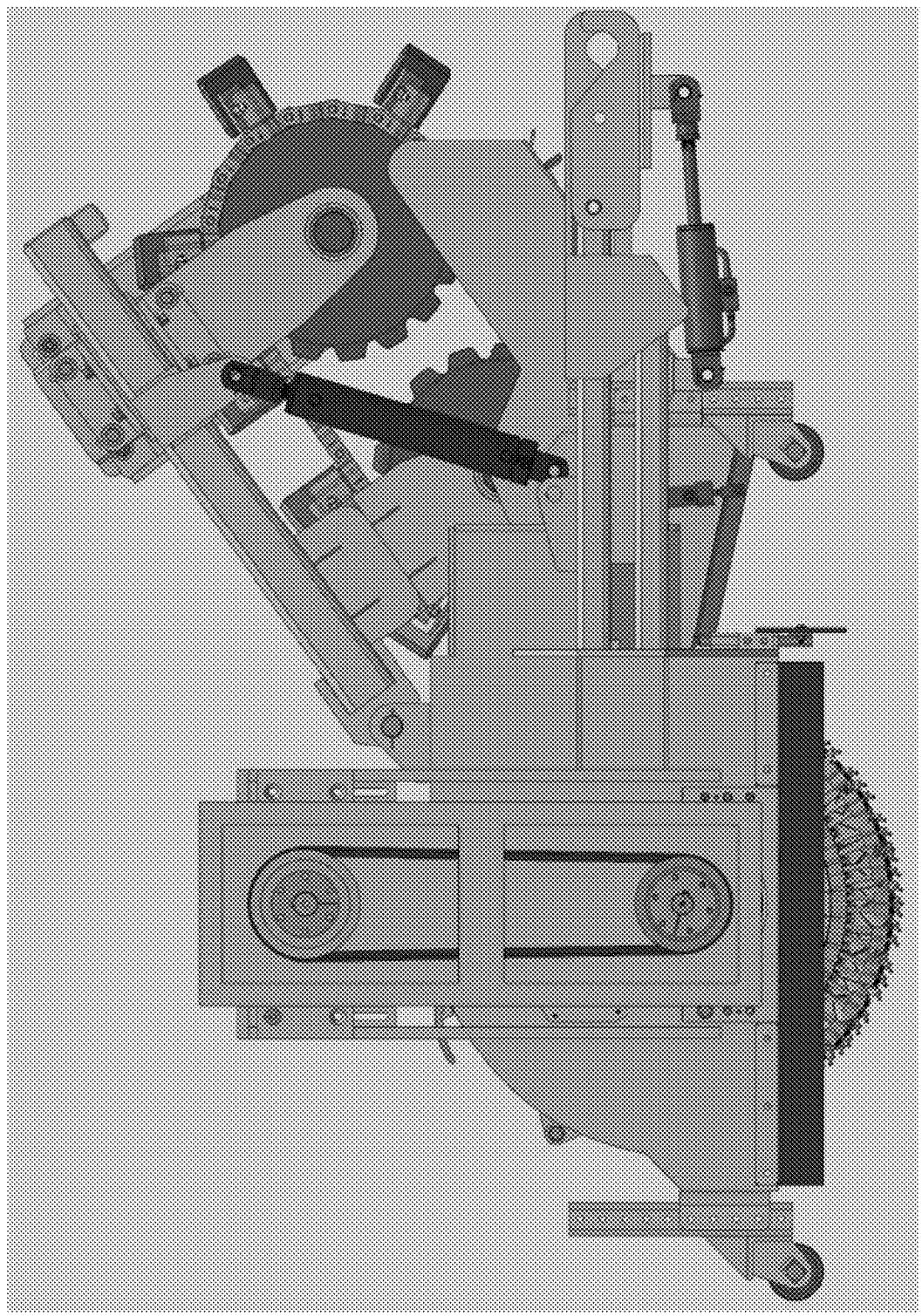
FIG. 28 shows a side view of a preferred embodiment of the grinder head and drag conveyor of the present invention.
Figures 29, 30:
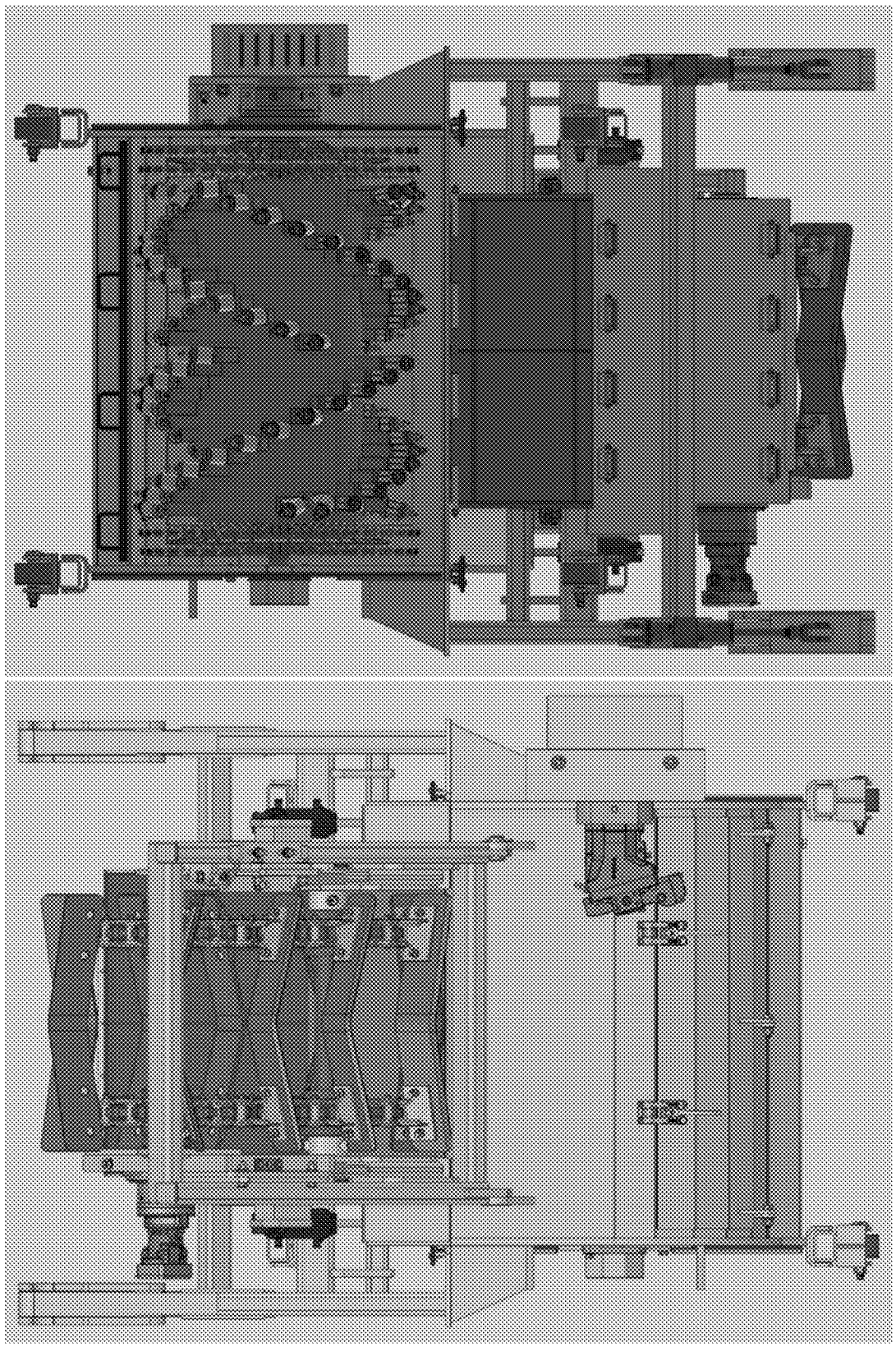
FIG. 29 shows a top view of a preferred embodiment of the grinder head and drag conveyor of the present invention; and, FIG. 30 shows a bottom view of a preferred embodiment of the grinder head and drag conveyor of the present invention.

A prototype of the present invention was created with the following specifications, however, it is noted that other suitable specifications can be used: the grinder drum measured 20 inches in diameter; the rotational speed was variable with a maximum of 160 rotations per minute; the rotation was hydraulically driven; the depth of the cut was variable to 5.5" from top of rail; the cutting width was 47"; and the tooth design was a carbide tipped scrolling pattern.

In one or more embodiments, the cutting depth is adjustable. In one or more embodiments, the cutting depth is adjustable by two hydraulic cylinders. The cutting depth may also be adjustable by other suitable methods or devices.

The present invention may have duel drive variable speed hydraulic motors. Alternatively, it could utilize another suitable drive mechanism. Additionally, the grinder head of the present invention may be mobilized through attachment to a track cleaner apparatus or other device for riding on tracks, such as that described in U.S. patent application Ser. No. 15/717,768, or other similar device.

The present invention preferably utilizes a drum 200 that is 47 inches wide by 39 inches in outside diameter, allowing for an 11-inch deep cut. The rollers are preferably adjustable, allowing the 11-inch cut to be adjustable to the rails being cleaned. Preferably, this is adjustable up to 7 inches below the top of the rail and 3 inches above the rail. Other suitable dimensions for this drum 200 may include from 47" wide by 5.5" deep cut (from top of rail), or other suitable dimensions for the tracks to be cleaned.

The present invention may utilize carbide tipped cutting teeth 207. In one embodiment, approximately 90 carbide tipped cutting teeth 207 are utilized. However, any suitable number or arrangement of cutting teeth 207 can be used. Preferably, the carbide tipped teeth are held in a tooth holder, and the tooth holder is preferably attached to the drum 200. Preferably, the tooth holder is attached via welding to the drum 200. Preferably, the cutting teeth 207 are attached to the drum 200 of the present invention with a flexible material that allows the teeth to clean around the railroad tracks and ties. Preferably, the flexible material is wire rope 201, or another suitable material. In a preferred embodiment shown in FIG. 13, both carbide tipped teeth 201 and wire rope teeth 206 are used. In other preferred embodiments, only carbide teeth 201 are used. In other preferred embodiments, only wire rope teeth 206 are used. Preferred embodiments of the present invention may include wire rope teeth 206, carbide teeth 201, link chain teeth, or any other suitable material, and also combinations thereof.

In a preferred embodiment as shown in FIGS. 11-13, the grinder head and mold board of a preferred embodiment of the present invention 100 includes a grinder head 101 having a top door 103 and bottom mount, wherein the bottom mount has a bearing side piece 104 and a torque hub side piece 105. Preferably, bearings 109 are used as shown. Additionally, there is preferably a bearing guard 110 as shown. Parts connections in this preferred embodiment are preferably weldments as shown: a breaker weldment 106, welded coupling on the mounting plate 111, full threads with nut(s) welded 112, wear plate weldments 116, and outside and inside wire rope weldments 205, 206.

In some embodiments, the drum 200 of the present invention utilizes extensions that extend out from the drum 200. Preferably, these extensions are made of wire ropes 201 as a mechanism to clean hard-to-reach areas around railroad tracks and ties. As noted above, the wires ropes 201 are preferably attached to the drum via weldments 205, 206. However, other suitable methods of attachment may be used. In additional, other projections may be used instead of the wire ropes 201, such as cutting teeth 207. In embodiments where wire ropes are used, there is preferably also at least 2 wire rope covers 108, and at least two shaft lock collars 107. The drum 200 also preferably has a grinder torque hub 202, grinder input adapter 203, and a flanged bearing shaft 204, as shown in FIG. 13.

The grinder head 100 of the present invention may be attached to another vehicle or device for travelling on railroad tracks, such that it does not require its own motor or method of driving. However, in preferred embodiments, even where the grinder head 100 is connected to another device, it still has its own overhung load adapter 113 and motor 114, wherein the motor is preferably hydraulic. The grinder head 100 also has four-wheel assemblies 115, a dump door 117, spacer 118, rubbers 119, 121, rubber clamps 120, 122. Preferably, sheaves 123, 125 and sheave bushings 124, 126 are used as shown in FIG. 11. Preferably, the sheaves are 5V with 6 grooves. Preferably, a V-belt 127 and V-belt guard 128 are used as shown.

Preferred embodiments of the grinder head 100 of the present invention include a drag conveyor assembly 129 for transport of the removed debris to the long conveyor on the track cleaning machine. Preferably, a cylinder is used for drag conveyor lift 132, grinder dump 133, and mold board quick attach 134.

The drag conveyor 300 can be seen in more detail, for example, in FIG. 19. As shown, the drag conveyor 300 preferably has a frame 301 the same as or functionally similar to that shown in the figures. Preferably, a chain assembly 302, 303 and shaft sprocket assembly 304, 305 are used. Preferably, the shaft can be adjusted, preferably using a shaft adjustment assembly 306. There is preferably a rear shaft that preferably has a pivot 307 and a weldment 308 as its meeting. An adjustment rod 309 is preferably available as shown. Paddles 311 are preferably used to aid in moving debris along the conveyor. Similar to the grinder head 100, the drag conveyor 300 preferably has its own drive assembly 310, including its own independent motor 314. Preferably, the drag conveyor has a 4-bolt axial meeting ring 312 and a torque hub 313 as well.

PARTS LIST

The following is a list of parts and materials suitable for use in the present invention:
Parts Number Description
10 track cleaner apparatus of a preferred embodiment of the present invention
12 tracks
14 ties
100 grinder head and mold board of a preferred embodiment of the present invention
101 grinder head
103 top door
104 bottom mount—bearing side
105 bottom mount—torque hub side
106 breaker weldment
107 shaft lock collar (2)
108 wire rope cover (2)
109 bearing, preferably a 4-bolt flanged bearing
110 bearing guard
111 mounting plate with welded coupling
112 full thread with nut welded (2)
113 overhung load adapter (grinder)
114 motor (grinder), preferably hydraulic
115 grinder wheel assembly (4)
116 wear plate weldment (4)
117 grinder head dump door
118 spacer—sider rubber mount (11)

119 rubber—THS
120 rubber clamp—THS
121 rubber—BS
122 rubber clamp—BS
123 sheave—5V—6 grooves
124 sheave bushing
125 sheave—5V—6 grooves
126 sheave bushing
127 V-Belt—5Vx—6 sections
128 V-Belt Guard
129 drag conveyor assembly
130 rail rubber wiper
131 rail wiper arm
132 cylinder—drag conveyor lift
133 cylinder—grinder dump
134 cylinder—mold board quick attach
200 grinder drum
201 wire ropes
202 grinder torque hub
203 grinder input adapter
204 flanged bearing shaft
205 outside wire rope weldment
206 inside wire rope weldment
207 cutting teeth
300 drag conveyor
301 drag conveyor frame
302 chain assembly, left
303 chain assembly, right
304 shaft sprocket assembly, idler
305 shaft sprocket assembly, drive
306 shaft adjustment assembly
307 machining, rear shaft pivot
308 rear shaft meeting weldment
309 adjustment rod
310 drag conveyor drive assembly
311 paddle
312 4 bolt axial meeting ring
313 torque hub
314 drag conveyor motor All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An apparatus for clearing compact debris from railroad tracks, the apparatus comprising a grinder head, wherein the grinder head includes a cylindrical drum, a motor, a torque hub, an input adapter, a bearing shaft, and a drag conveyor, wherein the drag conveyor comprises a frame, a chain assembly, a shaft sprocket assembly, a shaft adjustment assembly, a shaft pivot, adjustment rod, drive assembly, and a plurality of paddles, wherein the drive assembly includes a torque hub, motor, and meeting ring.

2. The apparatus of claim 1 wherein the cylindrical drum has outer edges, and wherein the drum further includes flexible extension members along the outer edges of the cylindrical drum.

3. The apparatus of claim 2 wherein the drum further includes flexible extension members on the entire drum cylinder.

4. The apparatus of claim 3 wherein the extension members are made of wire rope.

5. The apparatus of claim 4 wherein the wire rope extension members are attached to the drum via weldments and/or bolting.

6. The apparatus of claim 3 further comprising a vehicle for moving the apparatus along a track distance to be cleaned, wherein said vehicle has a structural frame having a forward end and a rearward end,
   a plurality of road wheels for supporting the frame on paved roads or rough ground,
   a plurality of track wheels for supporting the frame on railroad tracks,
   an engine for driving at least some of the wheels so as to propel the vehicle.

7. The apparatus of claim 6 wherein the track wheels are retractable.

8. The apparatus of claim 2 wherein the extension members are made of wire rope.

9. The apparatus of claim 8 wherein the wire rope extension members are attached to the drum via weldments and/or bolting.

10. The apparatus of claim 2 further comprising a vehicle for moving the apparatus along a track distance to be cleaned, wherein said vehicle has a structural frame having a forward end and a rearward end,
    a plurality of road wheels for supporting the frame on paved roads or rough ground,
    a plurality of track wheels for supporting the frame on railroad tracks,
    an engine for driving at least some of the wheels so as to propel the vehicle.

11. The apparatus of claim 1 wherein the bearing shaft is flanged.

12. The apparatus of claim 11 further comprising a vehicle for moving the apparatus along a track distance to be cleaned, wherein said vehicle has a structural frame having a forward end and a rearward end,
    a plurality of road wheels for supporting the frame on paved roads or rough ground,
    a plurality of track wheels for supporting the frame on railroad tracks,
    an engine for driving at least some of the wheels so as to propel the vehicle.

13. The apparatus of claim 12 wherein the track wheels are retractable.

14. The apparatus of claim 1 further comprising a vehicle for moving the apparatus along a track distance to be cleaned, wherein said vehicle has a structural frame having a forward end and a rearward end,
    a plurality of road wheels for supporting the frame on paved roads or rough ground,
    a plurality of track wheels for supporting the frame on railroad tracks,
    an engine for driving at least some of the wheels so as to propel the vehicle.

15. The apparatus of claim 14 wherein the track wheels are retractable.

* * * * *